United States Patent Office 2,720,513
Patented Oct. 11, 1955

2,720,513

ROSIN CONDENSATION PROCESS

Alfred L. Rummelsburg, Chadds Ford, Pa., assignor to Hercules Powder Company, Wilmington, Del., a corporation of Delaware No Drawing. Application December 29, 1951,
Serial No. 264,241

13 Claims. (Cl. 260—97)

This invention relates to a process for treating rosin and rosin compounds to produce a resinous condensation product of improved properties.

It is known that rosin is deficient for many purposes, particularly because of its softness and poor bodying characteristics. Polymerization of rosin has been one means practiced by the art to overcome such deficiencies, and by this means some improvement has been obtained in bodying, drying and flexibility characteristics. Another method for improving rosin has involved treatment with certain aldehydes to form aldehyde condensation products. The softening point of rosin was thereby increased to some extent but the process was unsatisfactory due to the tendency of aldehydes to polymerize during the reaction, and the improvement in properties of the rosin was not entirely satisfactory. There has been a need in the art for a process which would improve the properties of rosin without the attendant disadvantages of the prior art processes.

Now in accordance with this invention it has been found that when rosin and rosin compounds containing two ethylenic double bonds in the rosin nucleus are reacted in the presence of an acidic siliceous clay catalyst with a monoether, monoester, or ether-ester of a gem-diol, or with a gem-diether or gem-diester wherein the oxygen atoms are attached to acyclic carbon atoms, there is produced a condensation product exhibiting improved properties with simultaneous formation of by-product alcohol or acid. The process is particularly advantageous in that the clay catalyst may be easily separated from the reaction mixture to render the rosin condensation product easily obtainable. Also, the mildness of the catalysts substantially reduces the formation of unwanted by-products. When alcohols are formed as by-products the process may be carried out in a manner which will permit the carboxyl group of the rosin acids to be simultaneously partially esterified during the condensation reaction.

The general procedure for preparing the rosin condensates of this invention in a batch process involves contacting a solution of rosin in an inert solvent with, for example, an acetal such as dimethyl formal in the presence of an acidic siliceous clay catalyst such as an acid-activated montmorillonite, and heating the reaction mixture for a sufficient period of time to promote the desired degree of condensation. The reaction mixture may then be filtered to remove the catalyst and distilled to remove unreacted reagents, by-products, if present, and solvent, leaving the condensate as residue. When gem-diethers and gem-diesters are utilized, the by-products are alcohols and acids, respectively; with hemiacetals, both water and alcohol are formed and with hemiesters the by-products are water and acids.

The following examples represent specific embodiments of the invention. Unless otherwise specified, all parts are parts by weight and color grades refer to the rosin color scale.

*Example 1*

A solution of 200 parts N wood rosin in 250 parts benzene was placed in an electrically-heated stainless steel rocking-type autoclave, and 65 parts dimethyl formal and 25 parts of a commercial 200-mesh acid-treated montmorillonite clay catalyst were added. The catalyst had been calcined by heating at 400° C. for 3 hours. Nitrogen was used to sweep out the air and to pressure the reaction vessel to 100 p. s. i. g. at 25° C. The mixture was agitated for 2 hours at 120–125° C. with the pressure reaching a maximum of 175 p. s. i. g. during this period. The reaction mixture was then cooled to room temperature, removed from the autoclave, and filtered to separate the catalyst. The catalyst was washed with benzene, and the wash added to the previous filtrate. Unreacted dimethyl formal, by-product methanol, and solvent were removed by distillation at reduced pressure. The yield of rosin-dimethyl formal condensate amounted to 200 parts and the condensate had an acid number of 157, a drop softening point of 116° C. and a color of I+.

*Example 2*

A solution of 27 parts N wood rosin in 34.2 parts toluene and containing 4.5 parts dimethyl formal was heated in the presence of 1.71 parts of a calcined commercial acid-treated montmorillonite in a stainless steel autoclave provided with a steam jacket, a stirrer, and a thermocouple. The temperature was raised to 125° C. over a period of 25 minutes and maintained at this temperature for 155 minutes with samples being taken at intervals for analysis. A maximum pressure of 40 p. s. i. g. was developed. The mixture was then cooled and filtered and the unreacted dimethyl formal, by-product methanol, and solvent were evaporated as in Example 1. The characteristics of the samples taken are given in the following table:

| Time (Min.) | A. N. | Drop Soft. Pt., ° C. | Color (rosin scale) |
|---|---|---|---|
| 5 | 161 | 104 | N+ |
| 20 | 160 | 107.5 | N+ |
| 50 | 161 | 112 | N+ |
| 95 | 159 | 113 | M |
| 155 | 159 | 114 | N |

*Example 3*

The process of Example 1 was repeated with the exception that 9.0 parts dimethyl formal and 3.42 parts of a commercial acid-activated montmorillonite clay were utilized. After 15 minutes of reaction there was obtained a condensate having an acid number of 155, a drop softening point of 116° C. and a color M+.

*Example 4*

A solution of 35 parts N wood rosin in 25 parts of a a narrow-range hydrocarbon solvent was placed in an autoclave and 2.2 parts of a calcined commercial acid-treated montmorillonite clay and 2.45 parts dimethyl formal were added. The mixture was heated to 125° C. over a period of 25 minutes and agitated at this temperature for an additional 20 minutes. The maximum pressure developed was 60 p. s. i. g. The reaction mixture was then cooled and filtered and the unreacted dimethyl formal, by-product methanol, and solvent evaporated as in Example 1. The rosin-dimethyl formal condensate was found to have a drop softening point of 101° C. and a color of M. The acid number of the condensate was 163 as compared with the acid number of 164 for the original rosin, indicating that no appreciable esterification of the rosin acids with by-product methanol took place.

Example 5

The reaction of Example 1 was carried out using 35 parts N wood rosin, 1.8 parts dimethyl formal, 2.2 parts of a calcined commercial acid-treated montmorillonite clay in 25 parts benzene as solvent. The reaction temperature was raised to 135° C. over a period of about 25 minutes and maintained at this temperature for 15 minutes. The pressure in the autoclave amounted to 70–80 p. s. i. g. The rosin-dimethyl formal condensate produced had an acid number of 163, a drop softening point of 100° C. and a color K+.

Example 6

Following the procedure of Example 2, except that an electrically-heated stainless steel autoclave was utilized, 6 parts N wood rosin, 1.8 parts dimethyl formal and 0.7 part of a calcined commercial acid-treated montmorillonite clay in 8 parts of benzene were reacted for 2 hours at 120–125° C. The rosin-dimethyl formal condensation product which was isolated as in Example 1 was found to have an acid number of 156, a drop softening point of 114° C. and a color of K. Methoxyl content was 1.09% as compared to an original value of 0.3%.

2.02 parts of the above product was distilled at 2–2.8 mm. to a maximum pot temperature of 268° C. until about 0.87 part of distillate was obtained. The yield of residue amounted to 1.15 parts, and had an acid number of 144, a drop softening point of 157° C. and a color of I+.

Example 7

200 parts N wood rosin was dissolved in 700 parts xylene with agitation and warming under reflux. Agitation was continued at 60° C. and 200 parts of a calcined commercial acid-treated montmorillonite clay was added. Dimethyl formal in the amount of 65 parts was then added dropwise over a period of 10 minutes with continued agitation at 60° C. The temperature was raised to 84° C. and this temperature maintained with agitation for 4 hours. The mixture was then cooled to room temperature and filtered, the filter cake being washed with 4 portions of xylene and the washes added to the main filtrate. Excess dimethyl formal, by-product methanol, and xylene were removed by distillation leaving a rosin-dimethyl formal condensate yield of 193 parts having an acid number of 157, a drop softening point of 116° C. and color H.

Example 8

Following the procedure of Example 7, 250 parts N wood rosin, dissolved in 465 parts xylene in the manner of Example 7, was reacted with 18.8 parts dimethyl formal in the presence of 250 parts of the catalyst of Example 7. The reaction mixture was agitated at 95° C. for one hour and the product was isolated as in Example 1. The rosin-dimethyl formal condensate produced had an acid number of 162, a drop softening point of 106° C. and a color of WG+.

Example 9

The process of Example 1 was carried out except that dimethyl formal was replaced by dimethyl acetal. There was produced a condensate in the amount of 196 parts having an acid number of 151, a drop softening point of 98° C. and a color of F.

Example 10

In this example simultaneous esterification of N wood rosin was effected while condensing rosin with dibutyl formal. A solution of 159 parts N wood rosin in 315 parts p-diisopropylbenzene was agitated under reflux at 180–190° C. and 19 parts of a calcined commercial acid-treated montmorillonite clay was introduced. While agitation was continued 73 parts of dibutyl formal was added over a period of 15 minutes. The temperature dropped rapidly to 150–155° C. with refluxing where it was maintained for ½ hour. The reaction mixture was then cooled to 120° C. and filtered to remove the catalyst. Solvent was evaporated from the filtrate leaving a condensate yield of 167 parts. The acid number of the condensate was 130 as compared with 164 for the original rosin showing that the rosin had been partially esterified. 135 parts of the product was vacuum distilled at 1 mm. pressure to a maximum pot temperature of 258° C. until about 85 parts of distillate was obtained. The residue had a drop softening point of 135° C. and a butoxyl content of 3.7%.

Example 11

50 parts of freshly prepared crude methyl hemiformal was added to a solution of 300 parts N wood rosin in 300 parts benzene in a stainless steel rocking-type autoclave and 30 parts of a calcined commercial acid-treated montmorillonite clay was added. The autoclave was swept with nitrogen, pressured with nitrogen to 100 p. s. i. g. at 25° C., sealed, and then heated to 120° C. and maintained at this temperature for 2.5 hours with agitation. The maximum pressure developed amounted to 200 p. s. i. g. The rosin-methyl hemiformal condensate was recovered by the method of Example 1 and was found to have an acid number of 155, a drop softening point of 103° C. and a color of G.

Example 12

A solution of 250 parts N wood rosin in 250 parts xylene was agitated under slight reflux using an air condenser at 135–145° C. in the presence of 32 parts calcined commercial acid-treated montmorillonite clay. Agitation at this temperature was continued while passing into the solution 60 parts gaseous dimethyl formal over a period of 3.5 hours. The reaction mixture was then cooled to room temperature, filtered and excess dimethyl formal and solvent distilled off under reduced pressure. The product had an acid number of 157, a drop softening point of 101° C. and a color of M+.

Example 13

250 parts of N wood rosin in 465 parts xylene was agitated under reflux at 60° C. and about 250 parts of a calcined commercial acid-treated montmorillonite clay and 38 parts of ethylidene diacetate were added. The temperature was increased to 95° C. and maintained at this point for one hour with agitation. The reaction mixture was cooled to room temperature and filtered, the filter cake being washed with fresh xylene and the washes added to the previous filtrate. The condensate was recovered by the method of Example 1, resulting in a yield of 230 parts and having an acid number of 155, a drop softening point of 97° C., and a color M—.

Example 14

500 parts of Western pine wood rosin obtained from Jeffrey and Ponderosa pines and having an acid number of 140, a softening point of 73° C., and color G+, dissolved in 930 parts xylene was agitated under reflux at 60° C. About 60 parts calcined commercial acid-treated montmorillonite clay and 30 parts dimethyl formal were added. The reaction mixture was heated to 95° C. and refluxed with continued agitation. Samples were withdrawn at periodic intervals and analyzed. The analyses are shown in the following table:

| Time (hrs.) | A. N. | Drop Soft. Pt., ° C. | Color (Rosin Scale) |
|---|---|---|---|
| 0.5 | 140 | 85 | F+ |
| 1.5 |  | 87 |  |
| 2.5 |  | 87 |  |
| 3.5 |  | 90 |  |
| 4.5 | 137 | 91 | F |

Example 15

Western pine wood rosin obtained from Jeffrey and

Ponderosa pines having an acid number of 140, a drop softening point of 73° C., and a color G— was reacted according to the process of Example 8. The condensate produced had an acid number of 139, a drop softening point of 106° C. and a color I.

Example 16

The process of Example 1 was carried out using a commercial tall oil resin acids crystalline mixture in place of N wood rosin. The tall oil resin acids mixture had an acid number of 181 and a capillary softening point range of 75–95° C. The reaction produced an amorphous condensation product having an acid number of 158 and a drop softening point of 100° C.

Example 17

The process of Example 1 was carried out replacing the N wood rosin with crude wood rosin from which petroleum hydrocarbon-insoluble resin had been separated and which had an acid number of 153 and a drop softening point of 81° C. The condensate produced had an acid number of 146, a drop softening point of 110° C. and a color F. About 75 parts of the condensate was dissolved in 320 parts narrow-range gasoline with warming and agitation and the mixture then cooled to room temperature. The solution was decanted from a small amount of gasoline-insoluble matter and agitated for one hour at room temperature with 125 parts of a calcined commercial acid-treated montmorillonite clay. The mixture was filtered and the filter cake washed with fresh hydrocarbon solvent, the wash being added to the first filtrate. Solvent was evaporated at reduced pressure. The product, which amounted to 36 parts, had an acid number of 155, a drop softening point of 105° C. and a color K.

Example 18

The process of Example 8 was carried out replacing N wood rosin with crude wood rosin from which petroleum hydrocarbon-insoluble resins had been removed and which had an acid number of 153, a drop softening point of 81° C., and a color D. A condensate was produced in the amount of 217 parts and had an acid number of 152, a drop softening point of 111° C., and a color F+.

Example 19

The process of Example 18 was carried out with the exception that the quantity of calcined acid-treated montmorillonite clay was increased by 50%. The condensate produced amounted to 204 parts and had an acid number of 149, a drop softening point of 114° C. and a color G.

Example 20

A solution of 200 parts methyl ester of rosin in 700 parts xylene was agitated at 60° C. under reflux. 100 parts of a commercial acid-treated montmorillonite clay catalyst which had been precalcined at 400° C. for 3 hours was added to the solution followed by 65 parts dimethyl formal. The reaction temperature was increased to 84° C. with slow reflux where it was held with continued agitation for about 4 hours. The reaction mixture was filtered to remove the catalyst, and the filtrate distilled to remove excess dimethyl formal and solvent using a final bath temperaure of 200° C. at 15–20 mm. The yield of condensate residue amounted to 203 parts. Whereas the original methyl ester of rosin was a liquid which would flow easily, the product was a soft resin with a color WG. About 148 parts of the condensate was vacuum distilled at 1 to 2 mm. pressure using a maximum pot temperature of 260° C. The nonvolatile condensate residue had a drop softening point of 91° C.

Example 21

A solution of 250 parts N wood rosin in 465 parts xylene was agitated under reflux at 60° C. 125 parts of a calcined commercial acid-treated montmorillonite clay was added followed by 36 parts allylidene diacetate. The temperature was then increased to 95° C. and agitation continued for 1 hour at this temperature. After cooling to 50° C. the reaction mixture was filtered to remove the catalyst, and solvent and by-product acetic acid were evaporated from the filtrate using a final bath temperature of 210° C. at 15 mm. The condensate residue amounted to 247 parts and had an acid number of 154, a drop softening point of 97° C. and a color K.

Example 22

In this example tall oil was separated into its constituents by the selective condensation of the resin acids. The process of Example 1 was carried out except that N wood rosin was replaced by commercial tall oil. Following the condensation reaction 153 parts of condensate was distilled at 1 mm. pressure to a pot temperature of 250° C. Analysis of the distillate which amounted to about 107 parts showed that oleic acid was present to the extent of about 80% by weight. Hence transformation of the resin acids in tall oil into high-softening point, relatively nonvolatile condensate facilitated concentration of fatty acid constituents by distillation.

Example 23

A solution of 50 parts N wood rosin in p-menthane was agitated at 60° C. under reflux. Fifty parts of calcined commercial acid-treated montmorillonite clay was added followed by 1,1,3,3-tetraethoxypropane. Temperature was maintained at 125° C. while simultaneously distilling off ethanol through a trap. The reaction product, which was recovered as in Example 1, amounted to 50 parts and had an acid number of 148 and a drop softening point of 101° C.

Example 24

In this example 450 parts N wood rosin-dimethyl formal condensate prepared as in Example 2 and having an acid number of 160.5, a drop softening point of 103° C. and a color $K_5$ was bleached by heating to 285° C. in a nitrogen atmosphere under an air condenser over a period of 40 minutes. The condensate was maintained at this temperature for 10 minutes and then cooled over a period of 10 minutes. About 3% oils were distilled from the product at 1 mm. pressure and a pot temperature of 232° C. leaving a residue having an acid number of 152, a drop softening point of 104° C. and color N-WG.

The catalysts of this invention may be described as acidic siliceous clays and are exemplified by clays of the hydrous aluminum silicate type such as bentonites, subbentonites, montmorillonites, and the like, or their commercial acid-activated counterparts, which are available under various trade names.

The quantity of acidic siliceous catalyst can be varied widely. It has been found that up to 200% or more, based on the rosin or rosin compound may be utilized. The reaction rate is proportional to the quantity of catalyst employed and increases with increased quantities of catalyst. In many cases where the quantity of catalyst is varied from 30 to 200% by weight of the rosin, simultaneous color refining also occurs with the result that the condensate produced is substantially lighter in color than the original rosin. Noncalcined acidic siliceous catalysts are operable in the process, but precalcination improves the reactivity of the catalyst. Calcination involves heating the catalyst at temperatures above 150° C. for a few hours.

Any solvent which is inert under the conditions of the reaction can be utilized. Exemplary of such solvents are aromatic and aliphatic hydrocarbons such as benzene, toluene, xylene, etc., hexane, heptane, octanes, and narrow-range aliphatic hydrocarbon fractions boiling from 90–110° C. or higher. The particular solvent in any given case will often be dicated by the nature of the by-products formed. When an acetal such as dimethyl formal is utilized as a reagent, it is desirable that the solvent be chosen such that the by-product methanol will not form a single phase solvent-methanol azeotrope. When paraffin hydrocarbons boiling within the range of 90–110° C. are utilized, azeotropes with methanol consist of two phases, which may facilitate separation of methanol, and an azeotrope with excess dimethyl formal is not formed.

Polar solvents such as alcohols, ketones, and preferably ethers may also be used as solvents but are less suitable than hydrocarbons. When alcohols are utilized, reaction conditions must be sufficiently mild to prevent esterification with carboxyl groups of the rosin if simultaneous esterification is not desired. The condensation can be carried out in the absence of a solvent if the reaction temperature is sufficiently high to insure the molten state, but this procedure is less preferable.

The rosins and rosin compounds which may be modified according to this invention may be characterized as containing two ethylenic double bonds in the rosin nucleus. The rosins may be those obtained by extraction from the stumps from the Jeffrey and Ponderosa pines as well as the rosins well known to the art, such as, for example, the rosins obtained from the Southern long-leaf pine tree. The rosins may be either the crude or refined types and may be of either the wood or gum variety. The refined types of rosin which may be treated in accordance with this invention are those which have been distilled under reduced pressure with the injection of an inert gas, extracted with color body solvents, treated with various adsorbents for the removal of various impurities, as color bodies visible and latent, oxidized resin acids, etc. The rosin may be subjected to a preliminary heat-treatment or, if desired, the heat-treatment step may follow the treatment in accordance with the reaction of this invention, as may the other refining treatments given hereinabove. Desirably, the heat-treatment will follow the condensation reaction and will be carried out in an inert atmosphere as, for example, carbon dioxide, nitrogen, etc.

In addition to wood and gum rosin, the rosin compounds which may be treated in accordance with this invention include also the acids attainable from these rosins, such as, for example, abietic acid, neoabietic acid, levopimaric acid, dextropimaric acid, isodextropimaric acids, etc.; esters of these rosin acids with a monohydric or polyhydric alcohol such as methylabietate, ethylabietate, glycol abietate, glycerol abietate, pentaerythritol abietate, etc.; the alcohols produced by the reduction of the carboxyl group of a rosin acid such as abietyl alcohol, pimaryl alcohol, etc. and also the esters of these alcohols.

Rosin acids containing materials such as tall oil and rosins separated from tall oil, such as sulfate wood rosin, may be modified according to this invention. It is desirable to remove from such material prior to modification in accordance with this invention any contaminants which might react with the reagents used. When tall oil is treated in accordance with the process of this invention the rosin constituents of tall oil form a condensate with the modifying agent employed, whereas the fatty acid constituents do not. The fatty acid constituents may be separated from the condensate by vacuum distillation and, therefore, the process of this invention provides a convenient method for separating the constituents of tall oil, while at the same time improving the properties of the rosin acids.

The modifying agents of this invention comprise monoethers, monoesters and ether-esters of gem-diols generally, the gem-diesters and gem-diethers wherein the oxygen atoms are attached to acyclic carbon atoms. A gem-diol is defined as a compound containing two hydroxy groups attached to the same carbon atom, the prefix "gem-" being an abbreviation of "geminate" and signifying that two groups are attached to the same carbon atom. Correspondingly, a gem-liether is a compound with two ether groups attached to a single carbon atom, and a gem-diester is a compound with two ester groups attached to a single carbon atom. Ether-esters of gem-diols are compounds containing an ether group and an ester group attached to the same carbon atom as in compounds such as 1-methoxy-1-acetoethane, 1-ethoxy-1-acetoethane, etc.

The gem-diethers and gem-diesters of this invention are characterized by having the ether and ester oxygen atoms attached to acyclic carbon atoms, that is, to carbon atoms which are not members of a ring structure, although possibly attached to a ring. Thus, compounds such as 1,1-dimethoxymethylbenzene are included within the scope of this invention, but compounds like 1,3-dioxolane are excluded. In general, the modifying agents of this invention include all compounds of the formula

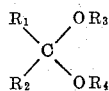

wherein $R_1$ and $R_2$ are hydrogen, alkyl, aryl, aralkyl or alkaryl radicals and may be the same or different. $R_3$ is an alkyl, aralkyl or acyl group and $R_4$ is hydrogen or a group identical to $R_3$.

Gem-diethers are generally known as acetals, which term is applied not only to compounds of the formula $CH_3CH(OR)_2$, but also to all similar compounds having the formula $RCH(OR)'_2$. Dimethyl-, diethyl-, dipropyl-, dibutyl-acetal, etc. are exemplary acetals and the term "acetal" is also intended to include formals such as dimethyl-, diethyl-, dipropyl-, dibutyl-, etc. formals as well as the corresponding propionals, butyrals, pentanals, and the acetals of acrolein, crotonaldehyde and glyoxal. Also included among the gem-diethers of this invention are ketene acetals and ketals generally. The dimethyl acetal of chloral, the diethyl acetal of furfural and 1,1,3,3-tetraethoxypropane may be specifically mentioned as representative acetals. Acyclic acetals and cyclic gem-diesters containing aromatic or heterocyclic substituents may be utilized and may contain non-hydrocarbon substituents such as nitro and halogen groups, etc. In addition, hemiformals such as methyl hemiformal, hemiacetals such as methyl hemiacetal and hemiesters such as 1-hydroxyethyl acetate can be used, but these are less preferable due to handling difficulties and less desirable products. The diester of gem-diols operable in this invention may be exemplified by compounds such as furyl gem-diesters, for example, furyl diacetate, methylidene diacetate, ethylidene diacetate and allylidene diacetate. In general, the diethers and diesters of gem-alkanediols are preferred.

The quantity of acetal or other modifying agent required in carrying out the process of this invention will depend upon the molecular weight of the modifying agent, reaction temperature, quantity of catalyst, and rosin or rosin compound concentration. By using an excess of modifying agent the most complete conversion of the rosin to the condensate can usually be obtained in the shortest possible time. The quantity of modifying agent is not critical, but will usually vary from 1 to 70% of the weight of the rosin or rosin compound, and preferably within the range of 1 to 30%.

When the process of this invention is carried out in a batch-type reaction, the temperature is preferably maintained within the range of about 60° to 170° C. with the most desirable range being about 80° to 145° C. In a continuous process wherein shorter up- and down-heat periods are possible, and better control in achieving very short reaction periods is obtainable, somewhat higher temperature ranges can be utilized. Temperatures as high as 200° C. can be used, but under these conditions esterification with by-product alcohol tends to increase.

When low-boiling reagents are utilized in carrying out the process of this invention, it is desirable to use a closed system. Operating pressures range from 25 to 200 p. s. i. g. depending upon other reaction conditions and quantities of reagents utilized. With a closed system under pressure it is possible to obtain substantial esterification by operating in the higher temperature ranges. Additional alcohol may be added prior to or during the process if completely esterified condensates are desired. When it is desirable to avoid a closed system it is possible to operate at atmospheric pressure under reflux by choosing a relatively high-boiling solvent for the reaction.

Reaction time can be varied widely and is a function of temperature, quantity of catalyst, amount of excess modifying reagent and concentration of rosin or rosin compound. The reaction time can be varied from about 1 minute to several hours and will usually lie within the range of 5 minutes to 2 hours. The quantity of the various reagents used in carrying out the process of this invention is not critical, but in order to achieve the greatest advantages from the process it is desirable when a solvent is used that the concentration of rosin or rosin compound based on the solvent be within the range of about 10 to about 80% by weight, and preferably within the range of about 35 to 65%. In general, the reaction time decreases as the concentration of rosin or rosin compound is increased.

By means of the process of this invention there may be produced rosin condensates having higher drop softening points and paler colors. Using gum rosin and dimethyl formal, there may be obtained a rosin condensate having a drop softening point as high as 130° C. if the reaction is carried out until about 60% or more rosin constituents are reacted. Varying degrees of drop softening points within the range of 80–130° C. can be obtained by controlling the reaction conditions and the quantities of reagent.

The condensates of this invention are useful in many applications where unmodified rosin compounds have been found wanting. Also, the condensate of this invention may be readily hydrogenated or dehydrogenated using well-known catalysts to produce additional interesting products. For example, a rosin-dimethyl formal condensate was readily hydrogenated in the molten state at 200° C. and 5000 p. s. i. g. using a Raney nickel catalyst. After 6 hours a product was obtained which absorbed 0.38% by weight of hydrogen as compared with 1.22% for the original condensates. The hydrogenated condensate had an acid number of 153, drop softening point of 101° C., and a color N+. Dehydrogenation of rosin-dimethyl formal condensate was effected by heating in the presence of a 5% palladium-on-carbon catalyst at 250–260° C. After ½ hour of reaction no abietic acid was identified in the reaction mixture. No loss in softening point occurred during the dehydrogenation process. Hydrogenated and dehydrogenated rosin condensates may be used in rubber compounding, adhesives, and in various other fields where ordinary rosin is unsuitable.

Rosin condensates of this invention may also be modified by reaction with compounds such as metal oxides or metal hydroxides to form resinates having high softening points and low solution viscosities. Such resinates are useful as stabilizers and driers in film-forming materials. In addition, rosin condensates of this invention may be esterified with alcohols such as glycerol, pentaerythritol, etc. to produce light-colored products having drop softening points and solution viscosities comparable to those of the condensate starting material. The light color in combination with other properties of these products renders them useful in protective coatings and related applications.

What I claim and desire to protect by Letters Patent is:

1. The process of producing a resinous condensation product which comprises subjecting a material containing a compound selected from the group consisting of rosin acids, esters of rosin acids, alcohols produced by the reduction of the carboxyl group of a rosin acid and esters of said alcohols, containing two ethylenic double bonds in the rosin nucleus to treatment in the presence of an acidic siliceous clay catalyst with a compound of the group consisting of monoethers, monoesters and ether-esters of gem-diols; and gem-diethers and gem-diesters wherein the ether and ester oxygen atoms are attached to acyclic carbon atoms at a temperature of about 60° to 200° C.

2. The process of producing a resinous condensation product which comprises subjecting rosin to treatment in the presence of an acidic siliceous clay catalyst with a gem-diether wherein the ether oxygen atoms are attached to acyclic carbon atoms at a temperature of about 60° to 200° C.

3. The process of producing a resinous condensation product which comprises subjecting rosin to treatment in the presence of an acidic siliceous clay catalyst with a gem-diester wherein the ester oxygen atoms are attached to acyclic carbon atoms at a temperature of about 60° to 200° C.

4. The process of producing a resinous condensation product which comprises subjecting rosin to treatment with dimethyl formal in the presence of an acidic siliceous clay catalyst at a temperature of about 60° to 170° C.

5. The process of producing a resinous condensation product which comprises subjecting rosin to treatment with dimethyl acetal in the presence of an acidic siliceous clay catalyst at a temperature of about 60° to 170° C.

6. The process of producing a resinous condensation product which comprises subjecting rosin to treatment with dibutyl formal in the presence of an acidic siliceous clay catalyst at a temperature of about 60° to 170° C.

7. The process of producing a resinous condensation product which comprises subjecting rosin to treatment with ethylidene diacetate in the presence of an acidic siliceous clay catalyst at a temperature of about 60° to 170° C.

8. The process of producing a resinous condensation product which comprises subjecting rosin to treatment with dimethyl formal in the presence of acid-treated bentonite at a temperature of about 60° to 170° C.

9. The process of producing a resinous condensation product which comprises subjecting rosin to treatment with dimethyl formal in the presence of acid-treated montmorillonite at a temperature of about 60° to 170° C.

10. The process of producing a resinous condensation product which comprises subjecting rosin in solution to treatment with dimethyl formal in the presence of acid-treated bentonite at a temperature of about 80°–135° C.

11. The process of producing a resinous condensation product which comprises subjecting rosin in solution to treatment with dimethyl formal in the presence of acid-treated montmorillonite at temperatures of about 80°–135° C.

12. The process of producing a resinous condensation product which comprises subjecting tall oil to treatment with an acetal in the presence of acid-treated montmorillonite and by distillation separating fatty acid constituents from the condensation product produced at a temperature of about 60° to 170° C.

13. The product produced by the process of claim 1.

References Cited in the file of this patent

UNITED STATES PATENTS

| Number | Name | Date |
|---|---|---|
| 2,022,456 | Binapfl | Nov. 26, 1935 |
| 2,052,073 | Binapfl | Aug. 25, 1936 |
| 2,084,213 | Osterof | June 15, 1937 |
| 2,115,496 | Maters | Apr. 26, 1938 |
| 2,372,446 | Osterof | Mar. 27, 1945 |
| 2,419,211 | Harris | Apr. 22, 1947 |
| 2,572,071 | St. Clair et al. | Oct. 23, 1951 |